United States Patent [19]

Yamada

[11] Patent Number: 4,691,238

[45] Date of Patent: Sep. 1, 1987

[54] METHOD AND APPARATUS OF STORING IMAGE DATA INTO A MEMORY IN A LAYOUT SCANNER SYSTEM

[75] Inventor: Mitsuhiko Yamada, Kyoto, Japan

[73] Assignee: Dainippon Screen Mfg. Co., Ltd., Kyoto, Japan

[21] Appl. No.: 517,983

[22] Filed: Jul. 29, 1983

[30] Foreign Application Priority Data

Oct. 21, 1982 [JP] Japan ................................. 57-185067
Nov. 17, 1982 [JP] Japan ................................. 57-202299

[51] Int. Cl.$^4$ ............................................. H04N 1/40
[52] U.S. Cl. .................................... 358/280; 358/287; 382/45; 382/46; 382/47
[58] Field of Search ............... 358/258, 256, 287, 293, 358/298, 280; 382/41, 44, 45, 47, 46; 364/514, 518, 521, 522, 523

[56] References Cited

U.S. PATENT DOCUMENTS

| | | | |
|---|---|---|---|
| 3,976,982 | 8/1976 | Eiselen | 358/287 |
| 4,345,276 | 8/1982 | Colomb | 364/523 |
| 4,538,183 | 8/1985 | Kanno et al. | 358/287 |

FOREIGN PATENT DOCUMENTS

| | | |
|---|---|---|
| 57-18184 | 1/1982 | Japan . |
| 57-6650 | 1/1982 | Japan . |
| 57-39877 | 3/1982 | Japan . |

*Primary Examiner*—Edward L. Coles, Sr.
*Attorney, Agent, or Firm*—Lowe Price LeBlanc Becker & Shur

[57] ABSTRACT

Image data obtained from scanning original pictures for reproducing images and image data obtained from condensing said image data for displaying on a monitor are stored into a memory or distinct memories in a layout scanner system which is capable of performing layout work by using a monitor.

13 Claims, 1 Drawing Figure

METHOD AND APPARATUS OF STORING IMAGE DATA INTO A MEMORY IN A LAYOUT SCANNER SYSTEM

FIELD OF THE INVENTION

This invention relates to a method of storing image data into a memory device in a layout scanner system, particularly to such a method in a layout scanner system in which image data obtained from an original picture by using a color scanner are stored into a memory and are successively read to a monitor to be laid out as an image.

BACKGROUND OF THE INVENTION

Recently, so-called a layout scanner was invented and put to practical use in some fields. The functioning of such a scanner includes steps of individually storing picture data and letter (drawing) data obtained from respective input devices into a large capacity memory such as a disc memory beforehand, reading each of the data to display them on a monitor such as a CRT display, and performing layout work by using a device such as a digitizer under control of a CPU (central processing unit). In the abovementioned system, the letter data as well as picture data can be obtained by scanning an original letter copy by using an input scanner as disclosed by the present applicant in the Japanese Patent Applications Nos. 57-6650, 57-18184, and 57-39877.

Generally speaking, a pixel size for sampling is about $50 \times 50$ ($\mu$m). So when a $10 \times 10$ (cm) picture is sampled by the above pixel size, and 8 bit data lines are provided for separation data Y, M, C, and K, for each of the colors which are formed from R, G and B color component signals through color correction, gradation correction etc., 4 M byte data capacity is required for each of the color separation Y, M, C, and K leading to a total requirement of 16 M byte data capacity. On the other hand, a usual color CRT used as a monitor for layout work has only $500 \times 500$ pixels which can afford to manage only 250K byte data for one color separation. Therefore to display said 10 cm picture on the full surface of the CRT screen, said 4 M byte data must be condensed into 250K byte data, the ratio of condensation being 1/16.

If said 16 M byte data are read from the disc memory and subjected to a condensing procedure under control of the CPU operation, comparably long time is needed for said reading and condensing procedure of the data.

In addition to that, as a condensing procedure, a method of picking up data representing one out of several pixels (in the aforesaid example, data corresponding to one pixel out of $4 \times 4 = 16$ pixels) is adopted. A resulting displayed image on the monitor is of low quality, and there is required much time if this defect is corrected by introducing a method of averaging out several data groups, which is impractical.

SUMMARY OF THE INVENTION

In reflection on the above conventional problem, this invention is made to provide a method of storing image data, the method being capable of shortening the data processing time in the layout procedure.

The above and other objects and features of this invention can be appreciated more fully from the following detailed description when read with reference to the accompanying drawings.

DETAILED DESCRIPTION OF A PREFERRED EMBODIMENT

Figure 1:
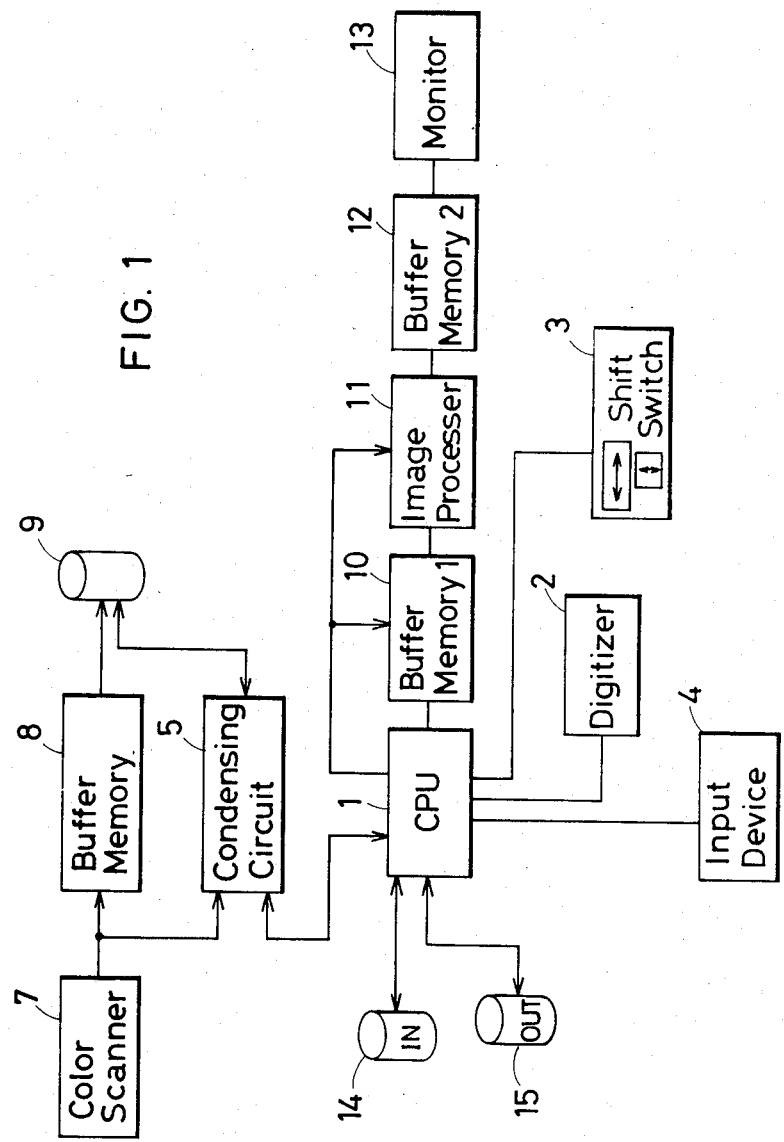
FIG. 1 is a block diagram of an example of a layout scanner embodying the method of this invention.

FIG. 1 shows an example of a layout scanner system for embodying the method of this invention. In the layout scanner system, at first image data obtained by scanning plural original pictures using a color scanner 7 are stored into a disc memory 9 via a buffer memory 8 as image data for output.

Then the data for output are transfered to a disc memory 14.

The transformation can be attained by manually changing the disc memory 9 for the disc memory 14 when the discs are of the media exchanging type or by transporting the data stored in the memory 9 to the memory 14 or using the memory 9 itself as the memory 14 when the discs are of the fixed type.

By using said image data for output, a conventional layout scanner system performs a layout procedure as follows. That is, line frame data for designating proper positions in a page for images separately stored as data in a buffer memory 12 under control of a CPU 1 by using a digitizer 2, are read to the monitor 13 to be displayed. Then the images corresponding to the image data which are read from the disc memory 14 and condensed by specified ratios for each occasion by the CPU 1 are distributed into corresponding line frames on the monitor 13 by being controlled by an image processer 11 via CPU 1 according to designation from a shift switch 3. The layout data determined by this operation are written into certain addresses of the buffer memory 12, which addresses correspond to the coordinates of the screen of the monitor 13. In the abovementioned description, position data for each image are under control of the CPU 1 and used as a data for producing layout data to be stored into a disc memory 15.

As said image processor 11 is composed of a so-called array processor mainly consisting of a look-up-table memory, by using the look-up-table memory, density gradation or partial color tone of reproduced images can be corrected. In the image processer 11, a data converter which converts the color separation data Y, M, C, and K into color component data R, G, and B for display as disclosed in Japanese Application No. 56-14479 by the same applicant of this invention is included.

The layout work is performed by repetition of the abovementioned method for every image, but it is time-consuming and impractical to condense the image data by the CPU 1 each occasion.

To avoid such inefficiency, the method of this invention adopts steps of writing image data obtained by scanning an original picture with the color scanner 7 into plural tracks of line memory provided in a condensing circuit 5, condensing the data under control of the CPU 1 as mentioned in detail later, and storing the condensed data into the disc memory 9 successively. In this case, said image data for output stored directly into the disc memory 9 and the condensed image data for display must have respective addresses.

Assuming that a scanned data of the original picture have m(longitudinal)$\times$n(lateral) pixels, to display an image corresponding to the data on the color monitor 13 (ordinarily this is a CRT screen having 500×500 pixels) the data must be condensed by a ratio of the higher of m/500 or n/500. Then the CPU 1 computes the appropriate ratio and designates the condensing circuit 5 to condense the image data by the computed ratio.

There are considered several ways to condense said data, one of which includes the steps of storing picture data corresponding to a certain number of scanning lines (when m/500 is a condensing ratio, the value is the line number) into some line memories, condensing the data group of which number of addresses in the plural line memory corresponds to the determined condensing ratio (m/500×m/500 in main and sub-scanning line when m/500 is a condensing ratio).

Meanwhile, although the in aforesaid embodiment, the condensed image data are stored in other addresses of the disc memory 9 to which the image data are brought directly from the color scanner 7, the condensed data can be stored into another memory.

If said both data are stored into different memories, simultaneous processing can be performed, which leads to time conservation.

Furthermore in a layout scanner system, sometimes a function as follows is required. That is, it may be a case that image data obtained from an original picture must be stored into a memory as data for output, of which the direction disagrees with that of an image displayed on a monitor. In this case, the image data from the original picture must undergo a rotation process to display the image data in the proper direction on the monitor. In this case, the rotation process can either be performed before said condensing process or in a reading process of the image data from the memory.

As is mentioned above, in a layout scanner system which records an image corresponding to plural original pictures with layout work, condensed data for display on a monitor in the layout process as well as image data for reproducing images obtained from the original pictures by an input device such as a color scanner are stored in the same or distinct memories, which leads to time conservation comparing to conventional layout scanner systems.

Moreover, as the data condensing process of this invention is attained by averaging data corresponding to several pixels of the original pictures, the data can provide a high quality image to be displayed on the monitor.

I claim:

1. A method of storing image data into a memory in a layout scanner system operable for storing image data from plural original pictures and then for performing layout work on a monitor with images corresponding to the image data comprising the steps of:
   (a) storing into a memory image data obtained by directly scanning the original pictures;
   (b) condensing the image data by a predetermined ratio to obtain condensed image data;
   (c) storing the condensed image data into a condensed image memory for displaying on the monitor, and
   selecting the condensing ratio as a higher one of m/N or n/N provided that the number of pixels of an original pictures is m×n and the number of pixels of a monitor screen is N×N.

2. A system for storing image data into a memory in a layout scanner system operable for storing image data from plural original pictures and then for performing layout work on a monitor with images corresponding to the image data comprising:
   (a) means for directly storing into a memory image data obtained by scanning the original pictures;
   (b) means for condensing said image data by a predetermined ratio to obtain condensed image data for display on the monitor and for storing the condensed image data into said memory or into another memory; and
   (c) selecting means for selecting the condensing ratio as a higher one of m/N or n/N provided that the number of pixels of an original picture is m×n and the number of pixels of a monitor screen is N×N.

3. An apparatus for processing image data for use in reproducing a plurality of images arranged in a predetermined layout comprising:
   a scanning means for obtaining raw image data of a plurality of originals;
   a first memory means for storing said raw image data obtained by said scanning unit;
   an image condensing means for condensing said raw image data at a predetermined ratio;
   a condensed image memory means for storing the condensed image data;
   a monitor means connected for receiving condensed image data from said condensed image memory means for simulating the images thereon in the predetermined layout; and
   another memory means for storing the image data stored in said first memory means in accordance with the predetermined ratio read out therefrom when the reproduction is carried out, wherein the condensed image data stored in said condensed image memory means is adaptable for simulating the images to be arranged in the predetermined layout, and
   means for rotating the image for display on said monitor means for proper orientation thereon by performing a rotation process on the image data.

4. A method of processing image data for use in reproducing a predetermined layout arrangement of a plurality of images, comprising the steps of:
   scanning a plurality of originals to be reproduced by a scanning unit, and obtaining image data thereof;
   storing said image data into a first memory means;
   condensing the image data from said first memory means at a predetermined ratio;
   storing the condensed image data into a condensed image memory means adaptable for simulating the images to be arranged as a predetermined layout on a monitor means;
   simulating the images in an arrangement corresponding to the predetermined layout;
   transferring and storing image data from said first memory means into another memory means in accordance with the simulated arrangement corresponding to the predetermined layout;
   reproducing the images arranged in the predetermined layout by reading out the image data stored in said another memory means forming said condensed image memory means; and
   rotating the image displayed on the monitor for proper orientation thereon by performing a rotation process on the image data.

5. A method as recited in claim 4 wherein said second mentioned storing step comprises the step of storing the condensed image in a portion of said first memory means.

6. A method as recited in claim 4 wherein said second mentioned storing step comprises the step of storing the condensed image in a second memory means, distinct from said first memory means.

7. A method as recited in claim 4 wherein said rotation process is performed on the image data prior to said condensing step.

8. A method as recited in claim 4 wherein said rotation process is performed on the image data after reading the condensed image data from said condensed image memory means.

9. An apparatus for processing image data for use in reproducing a plurality of images arranged in a predetermined layout comprising:
   a scanning means for obtaining raw image data of a plurality of originals;
   a first memory means for storing said raw image data obtained by said scanning unit;
   an image condensing means for condensing said raw image data at a predetermined ratio;
   a condensed image memory means for storing the condensed image data;
   a monitor means connected for receiving condensed image data from said condensed image memory means for simulating the images thereon in the predetermined layout;

another memory means for storing the image data stored in said first memory means in accordance with the predetermined ratio read out therefrom when the reproduction is carried out, wherein the condensed image data stored in said condensed image memory means is adaptable for simulating the images to be arranged in the predetermined layout, and means for setting said predetermined ratio for condensing said raw image data as the larger of two fractions m/N or n/N, wherein the image being processed includes m×n pixels and the number of pixels of said monitor is N×N.

10. An apparatus as recited in claim 9 wherein said condensed image memory means and said first memory means form a single memory.

11. An apparatus as recited in claim 9, wherein said condensed image memory means comprises a second memory means, distinct from said first memory means.

12. An apparatus as recited in claim 11 wherein said means for rotating the image is connected for receiving said raw image data and for performing said rotation process thereon.

13. An apparatus as recited in claim 11 wherein said means for rotating the image data is connected for receiving said condensed image data and for performing said rotation process thereon.

* * * * *